United States Patent [19]

Sanders et al.

[11] Patent Number: 4,902,871
[45] Date of Patent: Feb. 20, 1990

[54] APPARATUS AND PROCESS FOR COOLING A PLASMA ARC ELECTRODE

[75] Inventors: Nicholas A. Sanders, Norwich, Vt.; Richard W. Couch, Jr., Hanover, N.H.

[73] Assignee: Hypertherm, Inc., Hanover, N.H.

[21] Appl. No.: 249,407

[22] Filed: Sep. 26, 1988

Related U.S. Application Data

[63] Continuation-in-part of Ser. No. 9,508, Jan. 30, 1987, Pat. No. 4,791,268.

[51] Int. Cl.⁴ .................................................. B23K 9/00
[52] U.S. Cl. ........................... 219/121.49; 219/121.52; 219/121.51; 219/75
[58] Field of Search ........... 219/121.5, 121.51, 121.52, 219/121.48, 121.49, 121.39, 121.59, 74, 75

[56] References Cited

U.S. PATENT DOCUMENTS

| | | | |
|---|---|---|---|
| 2,784,294 | 3/1957 | Gravert | 219/75 |
| 2,898,441 | 8/1959 | Reed et al. | 219/75 |
| 2,923,809 | 2/1960 | Clews et al. | 219/69 |
| 3,004,189 | 10/1961 | Giannini | 219/121.51 |
| 3,082,314 | 3/1963 | Arata et al. | 219/75 |
| 3,131,288 | 4/1964 | Browning | 219/121 P |
| 3,242,305 | 3/1966 | Kure et al. | 219/75 |
| 3,534,388 | 10/1970 | Ito et al. | 219/75 |
| 3,619,549 | 11/1971 | Hogan et al. | 219/121.36 |
| 3,641,308 | 2/1972 | Couch, Jr. et al. | 219/75 |
| 3,787,247 | 1/1974 | Couch, Jr. | 219/121.36 |
| 3,833,787 | 9/1974 | Couch, Jr. | 219/75 |
| 4,203,022 | 5/1980 | Couch, Jr. et al. | 219/124.02 |
| 4,463,245 | 7/1984 | McNeil | 219/121.48 |
| 4,567,346 | 1/1986 | Marhic | 219/121.51 |
| 4,625,094 | 11/1986 | Marhic et al. | 219/121.51 |
| 4,649,257 | 3/1987 | Yakovlevitch et al. | 219/121.51 |
| 4,701,590 | 10/1987 | Hatch | 219/121.52 |
| 4,748,312 | 5/1988 | Hatch et al. | 219/121.51 |
| 4,777,343 | 10/1988 | Goodwin | 219/121.51 |

FOREIGN PATENT DOCUMENTS 0157702 10/1985 European Pat. Off. .
0159256 10/1985 European Pat. Off. .

OTHER PUBLICATIONS

Silvano Dallavalle et al., Toria Di Saldatura O Talio Al Plasma Con Arco Non Trasferito, Feb., 1986.

Primary Examiner—M. H. Paschall
Attorney, Agent, or Firm—Wolf, Greenfield & Sacks

[57] ABSTRACT

In a plasma arc torch, an electrode is movable axially into and out of electrical connection with an anode, typically a nozzle secured to one end of a torch body. A flow of pressurized plasma gas is directed to a plasma chamber between the electrode and the nozzle, preferably through a replaceable swirl ring that closely surrounds and guides the electrode at a larger diameter shoulder portion of the electrode. A gas flow passage, preferably a spiral passage machined on the outer side surface of the shoulder portion, diverts a portion of the gas flow from the plasma chamber to a region above the electrode where it is vented to atmosphere. The passage is sufficiently constricted that a substantial pressure drop appears along the path, while at the same time allowing a sufficient flow to produce the desired cooling. The revolutions of the spiral are preferably closely spaced to enhance the surface area of the electrode in a heat transfer relationship with the cooling gas flow.

17 Claims, 2 Drawing Sheets

APPARATUS AND PROCESS FOR COOLING A PLASMA ARC ELECTRODE

REFERENCE TO RELATED APPLICATION

This application is a continuation-in-part of U.S patent application Ser. No. 009,508 filed Jan. 30, 1987 now U.S. Pat. No. 4,791,268.

BACKGROUND OF THE INVENTION

This invention relates to plasma arc cutting systems. More specifically, it relates to a novel electrode, a novel electrode cooling system, and a novel gas cooling process for use with the electrode.

Applicants have devised an apparatus and method for contact starting a plasma arc torch which does not require the torch to touch the metal workpiece being cut or welded by the torch. The torch has an electrode that moves axially within the torch body under the influence of a spring and opposed gas forces which act on the lower surfaces of the electrode adjacent the anode, typically the torch nozzle. On start up, it wa found that gas pressure in the region between the electrode and could build to a sufficient level that they could lift the electrode against the spring. When the gas is cut off to stop cutting, the spring returns the cathode to a position where it contacts the anode and closes off the plasma exit port in the nozzle. This structure and mode of operation are described and claimed in the aforementioned parent U.S. patent application No. 009,508.

This development has been a significant improvement in arc contact starting and has found commercial acceptance. However, several areas for improvement have come to light. One relates to the fact that the electrode must be cooled. In earlier designs, applicants have split the plasma gas stream, directing a portion through a swirl ring to a region over the electrode, as shown in FIG. 1. After circulating around the upper surfaces of the electrode, the gas exits to the atmosphere through ports and passages formed in the torch body. This arrangement has several disadvantages. One is that the presence of pressurized air above the electrodes, as well as below it, produces a delicate balancing of the fluid forces acting on the electrode. This adversely affects the reliability of the separation of the electrode from the nozzle on start up. Another is that this cooling is relatively inefficient since the gas contacts only a fraction of the surface area of the electrode, and at a point most distant from the plasma arc. Finally, this cooling arrangement consumes more plasma gas since the portion used for cooling does not contribute to forming the plasma arc.

Another problem is that the mating surfaces of the housing (which is intended to mean the other housing as well as components which are mounted on the housing and can guide and support the electrode), must be machined to extremely tight tolerances in order to allow a sliding movement of the electrode, while at the same time blocking the flow of pressurized gas past the electrode. The machining requirements to produce parts with the requisite tight tolerances engender higher manufacturing costs, both for the torch as well as for replacement electrodes.

It is therefore a principal object of this invention to provide a cooling system and process for the electrode of a plasma arc torch, particularly one where fluid forces move the electrode for contact starting, which cools more effectively than known systems and does not interfere with the balance of forces acting to create the arc.

Another object is to provide a cooling system and process with the foregoing advantages that requires looser machining tolerances, and therefore a lower cost of manufacture, than comparable known systems and processes.

Yet another object is to provide a cooling system and process with the foregoing advantages that also consumes less plasma gas than comparable known systems and processes.

A still further object is to provide a cooling system and process with the foregoing advantages which can be readily retrofit onto existing plasma arc torches.

SUMMARY OF THE INVENTION

A plasma arc cutting torch has a torch body that mounts a nozzle (an anode) and an electrode (a cathode) movable axially within the torch body between a start-up position, where it is in electrical connection with the nozzle and closes an outlet orifice of the nozzle, and an operating position where the electrode is separated from the nozzle. A spring urges the electrode toward the nozzle. Plasma gas under pressure is guided through the torch body, and preferably through canted ports of a swirl ring, to a plasma chamber defined by the electrode, the nozzle and the torch body. In the preferred form the electrode has an integral shoulder portion whoso side surface is guided by the swirl ring.

A gas flow passage is formed in the electrode with one end communicating with the pressurized gas in the plasma chamber and a second end communicating with a region opposite from the plasma chamber. This region is sealed from a direct fluid communication with the plasma chamber by the close fitting relationship of the shoulder portion side surface and the surrounding swirl ring, but also by the cooling gas flow through this electrode passage. This region is vented through suitable passages in the torch body to atmosphere. This gas flow passage in the electrode allows a portion of the plasma gas entering the plasma chamber to flow through the electrode to cool it, but at the same time offers sufficient resistance to the fluid flow to produce a substantial pressure along the path and thereby allow the gas entering the plasma chamber on start up to reach a pressure level sufficient to move the electrode out of electrical connection with the anode against the force of the spring. The passage is preferably in the form of a spiral groove with at least 6 revolutions per inch, measured axially, in the direction of movement of the electrode, machined in the side surface of the shoulder portion of the electrode. The electrode is preferably formed as an integral, one-piece part of a material with excellent heat conductivity characteristics, such as copper.

These and other features and objects of the present invention will be more fully understood from the following detailed description which should be read in light of the accompanying drawings.

DETAILED DESCRIPTION OF THE PREFERRED EMBODIMENTS

Figure 1:
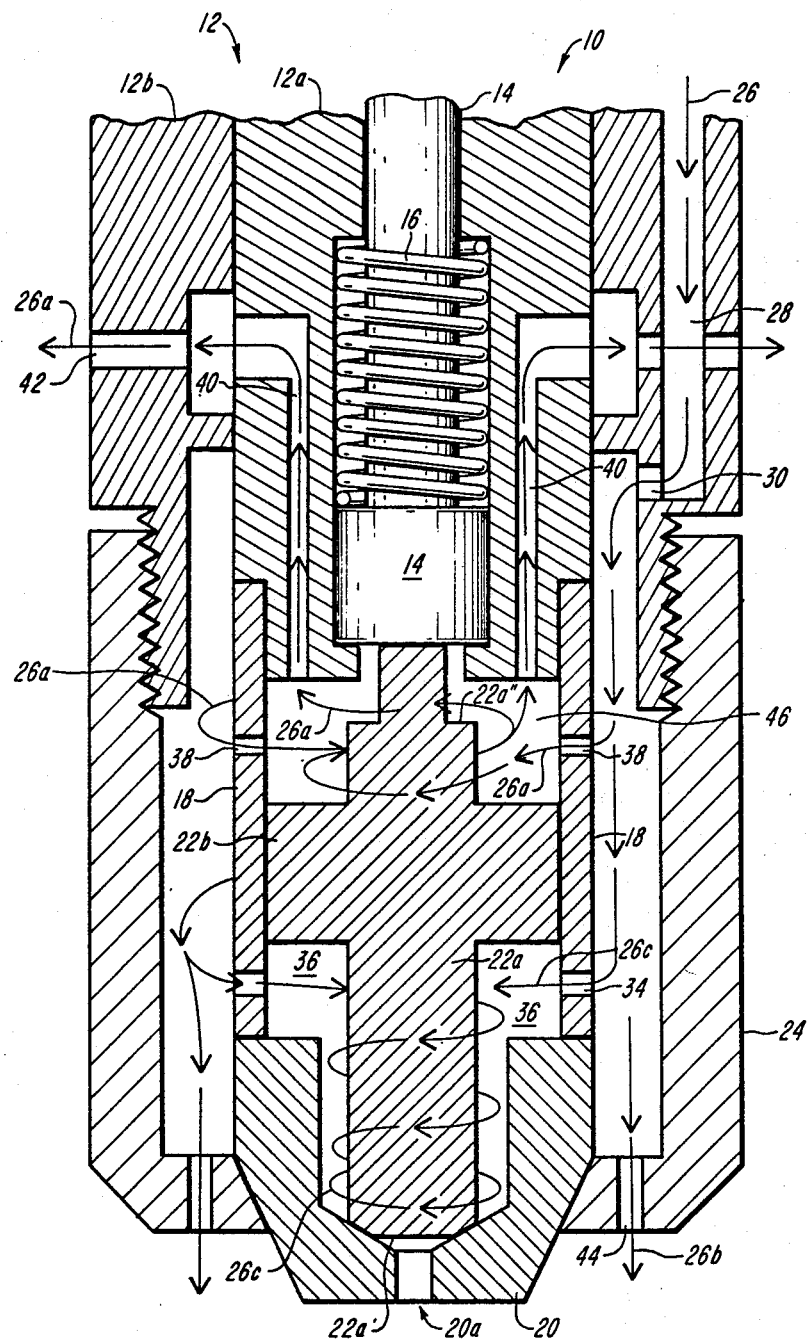
FIG. 1 is a view in vertical section of a plasma arc cutting torch with a fluid force contact starting capability.

FIG. 1 shows a plasma arc torch 10 of the type described in applicants' pending parent U.S. patent application No. 009,508 filed Jan. 20, 1987. The torch 10 has a torch body 12 with an inner component 12a and an outer component 12b, a plunger 14 and a spring 16 that drives the plunger downwardly, as shown. Consumable parts of the torch 10 include a swirl ring 18 secured to the lower end of the body component 12a, a nozzle 20 with a central plasma arc exit orifice 20a, an electrode 22, and a cap 24 threaded onto the body component 12b at its lower end. The cap 24 captures the nozzle and holds it in place. The electrode 22 is slidable axially (vertically a shown) within the swirl ring 18. In a starting position illustrated in FIGS. 1 and 2, the lower end face 22a closes off the exit orifice 20a. In a raised, operating position, an upper surface 22a'' of the body portion either abuts or is near the lower end of the body component 12a and the orifice 20a is open. This raising movement is accomplished using fluid forces.

A pressurized plasma gas flow 26 enters the torch via passage 28, port or ports 30, an annular passage 32 and canted ports 34 in the swirl ring 18, finally entering a plasma chamber 36 defined by the electrode, the swirl ring and the nozzle. In this FIG. 1 embodiment, a portion 26a of the plasma gas flow passes through a set of canted cooling ports 38 formed in the swirl ring to impinge on the upper surfaces of the electrode. This cooling gas flow 26a exits the torch through holes 40 in the body portion 12a and holes 42 in the body portion 12b.

In this FIG. 1 embodiment, the main plasma gas flow 26c entering the plasma chamber 36 pressurizes the chamber to create a fluid lifting force acting on the lower surfaces of the electrode. This force overcomes the spring force, and the back pressure of the cooling gas flow 26a acting in the upper surfaces of the electrode forcing the electrode to move upwardly to its operating position. The pilot arc produced as the electrode breaks electrical connection with the anode initiates a plasma arc which exits the torch through the orifice 20a where it attaches to a metal workpiece to be cut or welded. When the electrode is raised, the main gas flow 26c in the plasma chamber 26 swirls about the lower electrode body portion 22a, as shown. A portion 26b of the main gas flow 26 is also directed through holes 44 in the cap to cool torch parts other than the electrode. As noted above, in this form there is a problem in balancing the fluid forces acting on the electrode and there is cooling only at the top surfaces of the electrode.

Figure 2:
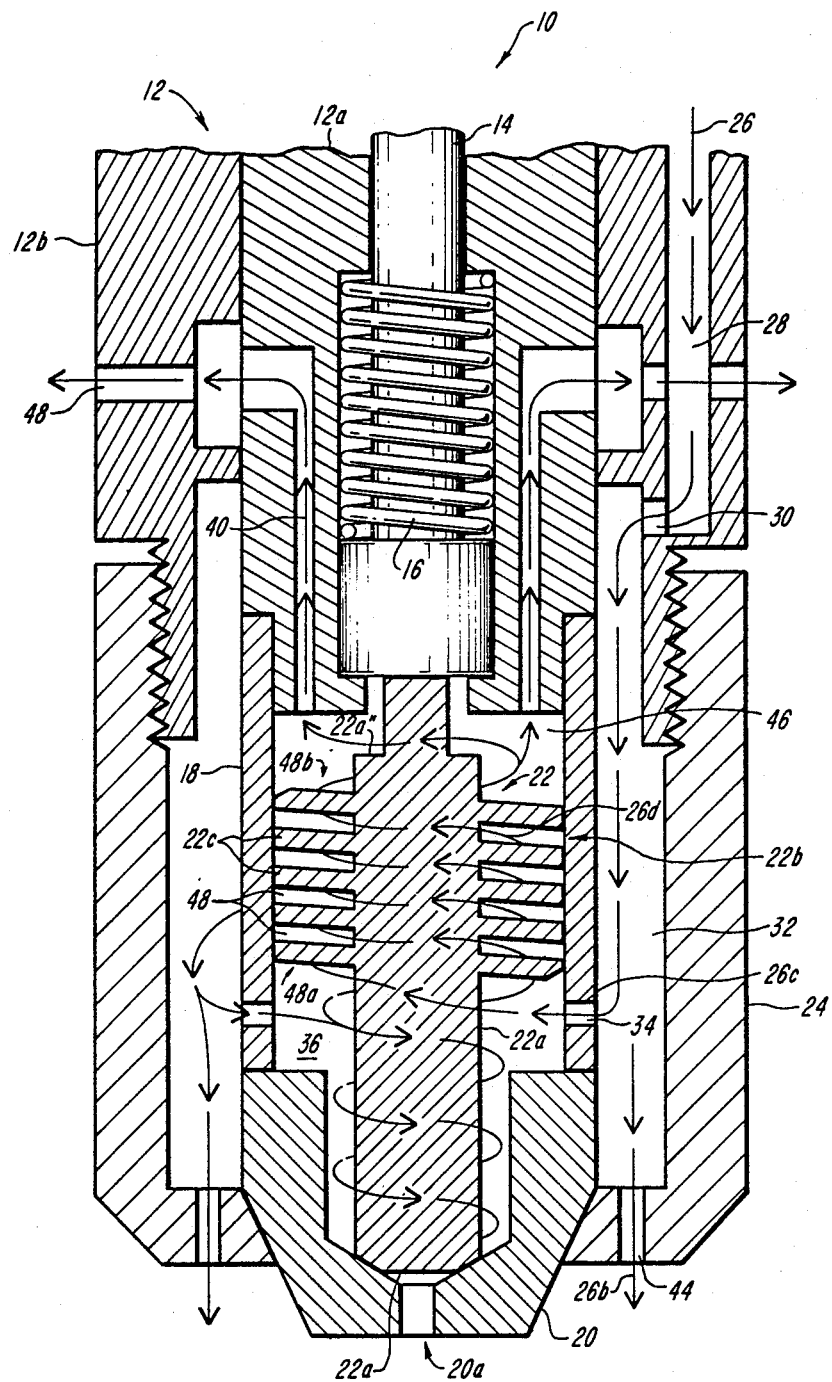
FIG. 2 is a view in vertical section corresponding to FIG. 1 showing a plasma arc torch with an electrode cooling system according to the present invention.

Turning now to the FIG. 2 embodiment, like parts in FIGS. 1 and 2 are identified with the same reference numbers. Most of the torch parts are identical to those described above with reference to FIG. 1, however, the electrode 22 is of a different design, and the swirl ring 18 is constructed differently, so that in combination they produce very different cooling gas flow paths within the torch 10 and eliminate the presence of a high pressure gas above the electrode. The plasma gas stream 26, except for a portion 26b that exits the cap through the holes 44, passes entirely through the canted ports 34 to enter the plasma chamber 36. There are no other openings in the swirl ring or other parts allowing a direct flow of plasma gas to a region 46 over the electrode (defined principally by the upper surfaces of the electrode, the swirl ring and the lower surfaces of the body component 12a). The flow 26b through the cap holes 44 serves the same cooling function described above with respect to FIG. 1.

A principal feature of this invention is a gas flow passage 48 formed in the electrode and extending from a first end 48a in fluid communication with the plasma chamber 26 and a second end 48b in fluid communication with the region 46. In the preferred form illustrated, the passage 48 is a spiral groove formed in the outer side wall of the shoulder portion 22b of the electrode. The cross-sectional dimensions, the length, and the configuration of the passage are such that a cooling gas flow 26d travels up the passage to the region 46, but the passage is sufficiently restrictive to the flow that there is a substantial pressure drop along the passage.

With the spiral groove configuration for the passage 48, the electrode "fins" 22c between the grooves act as heat transfer surfaces. They greatly increase the surface area of the electrode exposed to the cooling gas and thus more effectively cool the electrode than with the arrangement shown in FIG. 1. The flow of cooling gas between the fins 22c also produces a gas seal that blocks a flow of pressurized gas directly from the plasma chamber 26 to the region 46 along the interface between the swirl ring and the electrode. This allows the electrode, particularly the side surfaces of the shoulder portion, to be machined to looser tolerances than in the FIG. 1 embodiment. By way of illustration, but not of limitation, for an electrode having a maximum diameter of 0.5 inch, and with a pressurized gas flow 26 at 40 psi, the aforementioned operational characteristics can be observed with revolutions machined at a frequency of twenty per inch (measured axially), and a groove having a generally constant depth of approximately 0.080 inch and a width (also measured axially as shown) of 0.025 inch. More generally, using a spiral groove on an electrode of generally a half inch maximum diameter, the groove should have at least six revolutions per inch, with the groove having a depth (measured laterally as shown) of at least 0.040 inch and a "width" (measured vertically as shown) of at least 0.020 inch.

Because there is a substantial pressure drop along the passage 48, the gas flow 26c pressurizes the chamber rapidly with only a small pressure acting on the opposite surfaces of the electrode in the region 46. This pressurization "blows back" the electrode against the force of the spring 16 allowing the flow 26c in the plasma chamber to assume an unrestricted swirling pattern, as shown in FIG. 2, which is conducive to the formation of a good quality plasma arc. The cooling arrangements of the present invention therefore provide both an effective cooling of the electrode as well as reliable contact starting through a gas blow back of the electrode.

Stated in process terms, the present invention involves supplying a pressurized flow 26 of plasma gas, forming a gas flow passage through the electrode, diverting a portion 26d of the flow through the passage to cool the electrode, while at the same time restricting the cooling gas flow through the passage sufficiently to maintain a substantial pressure drop along the passage.

There has been described a cooling system and process which provides an enhanced cooling of the electrode and a reliable "blow back" of the electrode for gas-pressure actuated contact starting. This invention can be practiced on any existing torch where the plasma gas is the cooling gas by replacing consumable parts with ones having the features described and claimed herein.

While the invention has been described with respect to its preferred embodiments, it will be understood that various modifications and alterations will occur to those skilled in the art from the foregoing detailed description and the accompanying drawings. For example, while the invention has been described with respect to a spiral groove cut in the outer surface of the shoulder portion, it could be formed by a non spiral passage, multiple independent passages, or passages machined through the body of the electrode as well as the shoulder. Further, while the invention has been described with respect to an electrode that moves axially for contact starting, the features of the present invention could be applied to a stationary electrode. Further, while the electrode has been described as moving within a swirl ring as a guide and support element, it will be understood that it could be mounted to move within the torch body or some other replaceable torch component. Therefore, as used herein, "torch body" should be interpreted to include the swirl ring or other component acting as a guide and support for the electrode. These and other modifications and variations are intended to fall within the scope of the pending claims.

What is claimed is:

1. In a plasma arc torch having (i) a torch body, (ii) an anode supported on the body, (iii) a cathode mounted for an axial sliding movement within the body, said cathode, anode and torch body defining a plasma chamber, (iv) resilient means mounted within the body that urges said anode and said cathode into electrical contact, (v) means for directing a pressurized flow of a plasma gas to said plasma chamber to produce a fluid force within said plasma chamber that separates said anode from said cathode, and (vi) a volume opposite the chamber that is vented to atmosphere which is at a substantially reduced pressure as compared to the gas pressure in said plasma chamber, the improvement comprising
a cooling gas flow passage formed in said cathode that is in fluid communication between said plasma chamber and said volume, said passage being dimensioned and configured to restrict a gas flow therethrough to a sufficient degree to maintain a pressure differential between the plasma gas in said plasma chamber and the plasma gas in said volume, while at the same time passing a sufficient gas flow to said volume to cool the cathode.

2. The improved torch of claim 1 wherein said body includes a replaceable swirl ring secured to the body and closely surrounding said cathode at a side surface to allow its axial sliding movement while blocking any significant flow of gas from the plasma chamber to said volume except said flow through said gas flow passage.

3. The improved torch of claim 2 wherein said cooling gas flow passage comprises a spiral groove formed in said side surface of said cathode.

4. The improved torch of claim 3 wherein said spiral groove has at least 6 grooves per inch, measured axially, to place a large surface area of said cathode in contact with said cooling gas flow passage.

5. The improved torch of claim 4 wherein said cathode is formed of a material having a very good heat conductivity characteristics and said sprial groove has at least 10 grooves per inch, measured axially.

6. The improved torch of claim 4 wherein said groove has a depth of at least 0.040 inch and a width of at least 0.020 inch.

7. An electrode for a plasma arc cutting torch having a torch body, an anode secured on the torch body with a central outlet orifice for said plasma arc, resilient means mounted within the body that urges said electrode into electrical connection with said anode, and means for directing a flow of pressurized plasma gas to a plasma chamber defined by said electrode, said anode, and said torch body to produce a liquid force within said plasma chamber that separates said electrode from said anode against the force of said resilient means, said electrode comprising,
a body portion that seals said outlet orifice when said electrode and said anode are in electrical connection,
a shoulder portion having an outer side surface in a closely spaced, sliding engagement with said torch body that also provides a seal against a flow of the pressurized gas from the plasma chamber along said outer side surface, and
a cooling gas flow passage formed in said electrode and extending between a first end of said electrode open to said plasma chamber and a second end open to a region sealed from said plasma chamber by said shoulder portion,
said cooling gas flow passage being dimensioned and configured to restrict the flow of the pressurized gas therethrough to maintain a substantial pressure differential between the gas pressures at the ends of said passage while at the same time allowing a sufficient cooling gas flow through said passage to cool said electrode.

8. The electrode of claim 7 wherein said body portion and said shoulder portion are formed integrally.

9. The electrode of claims 6 or 7 wherein said electrode is formed of a material having a large coefficient of heat conductivity.

10. The electrode of claim 9 wherein said material is copper.

11. The electrode of claim 9 wherein said cooling gas passage is a spiral groove formed in said side surface of said shoulder portion.

12. The electrode of claim 11 wherein said groove has at least 6 grooves per inch, measured axially.

13. The electrode of claim 12 wherein said groove has a depth of at least 0.04 inch and a width of at least 0.020 inch.

14. A process for cooling an electrode mounted in a torch body of a plasma arc torch at a plasma chamber also defined by an anode mounted on the torch body, comprising
directing a flow of pressurized plasma gas to said plasma chamber,
forming a gas flow passage through said electrode extending from said plasma chamber to a region sealed from said chamber and at a lower gas pressure than said plasma chamber, and
diverting a portion of said pressurized gas flow through said passage to cool said electrode, and
restricting said diverted flow through said passage to produce a substantial pressure drop along the length of said passage.

15. The electrode cooling process of claim 14 wherein said forming produces a spiral groove.

16. The electrode cooling process of claim 14 wherein said electrode is movable against a spring force and said restricting produces a sufficient pressure differential to move said electrode against said spring force.

17. In a plasma arc torch having (i) a torch body, (ii) an anode supported on the body, and (iii) a cathode mounted for an axial sliding movement within the body, said cathode, anode and torch body defining a plasma chamber, the improvement comprising resilient means mounted within the body that urges said anode and said cathode into electrical contact, means for directing a pressurized flow of a plasma gas to said plasma chamber to produce a fluid force within said plasma chamber that separates said anode from said cathode, a volume opposite the chamber that is vented to atmosphere which is at a substantially reduced pressure as compared to the gas pressure in said plasma chamber, and a cooling gas flow passage formed in said cathode that is in fluid communication between said plasma chamber and said volume, said passage being dimensioned and configured to restrict a gas flow therethrough to a sufficient degree to maintain a pressure differential between the plasma gas in said plasma chamber and the plasma gas in said volume, while at the same time passing a sufficient gas flow to said volume to cool the cathode.

* * * * *